Sheet 2.
Gouvion G. Griswold.
Improvement in Umbrellas.
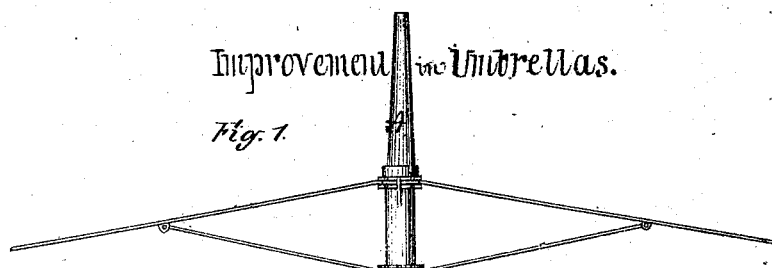
  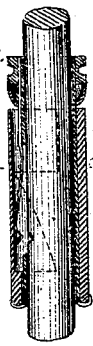  
  
  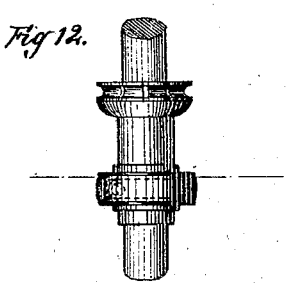 
Witnesses:
Godfrey Mathys
C. Otis G. Walker
Inventor:
Gouvion G. Griswold
by B. F. James
his atty.

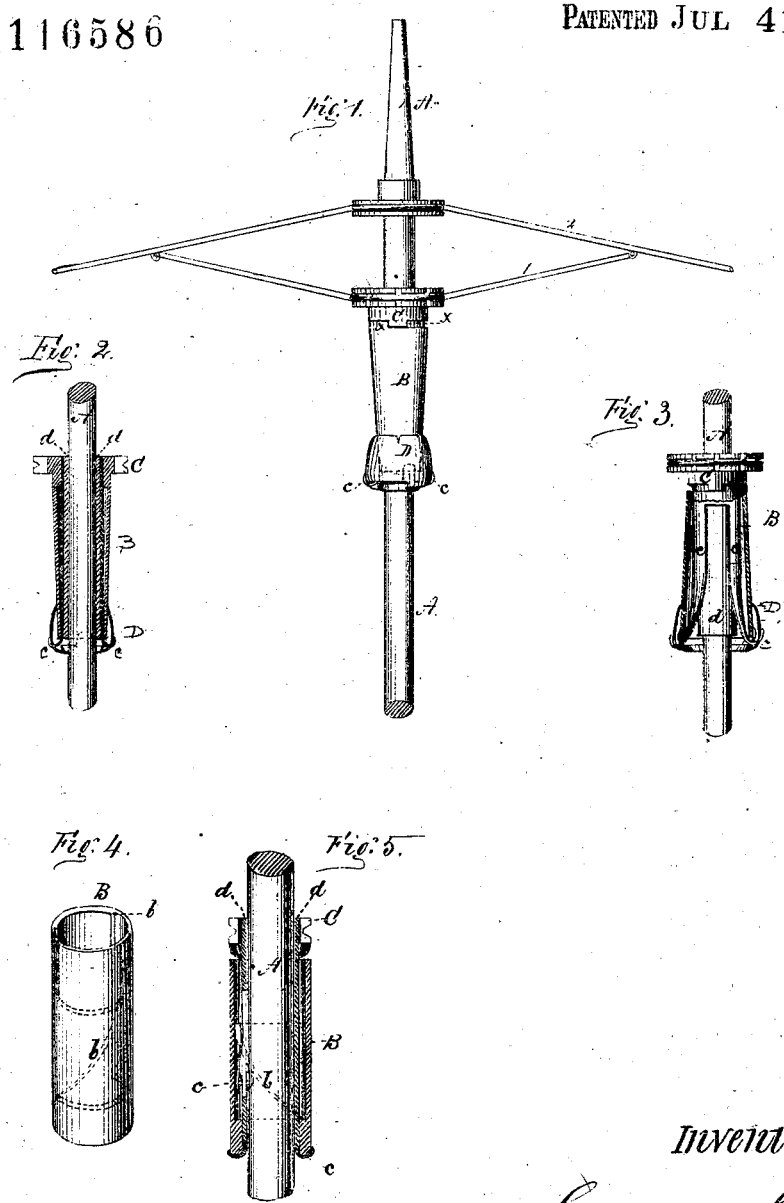

UNITED STATES PATENT OFFICE.

GOUVION GHOLSON GRISWOLD, OF BROOKLYN, NEW YORK.

IMPROVEMENT IN UMBRELLAS.

Specification forming part of Letters Patent No. 116,586, dated July 4, 1871; antedated June 24, 1871.

*To all whom it may concern:*

Be it known that I, GOUVION GHOLSON GRISWOLD, of the city of Brooklyn, county of Kings and State of New York, have invented a new and useful Improvement in Umbrellas; and I do hereby declare the following to be a full, clear, and exact description of the construction and operation of the same, reference being had to the annexed drawing making a part of this specification.

The nature and object of my invention are to construct and apply what is termed an umbrella-runner in its relation to the stick in such a manner as to avoid the necessity of the use of wire-stops, or cutting in any manner the umbrella-stick to receive wire or other springs, which, when so cut, materially weakens the stick itself, and is liable to be broken off at the points where such wire-stops are inserted or the cut made to receive the spring. It also consists in the construction of springs attached to the sides of the runner, (either one or more,) to which runner the ribs or supports of the stretchers are attached, said springs, at their lower or free ends, having projections (one or more) formed on their inner surface, so that when pressed inward toward the stick such depressions may impinge upon the stick or into depressions made in the stick, thereby holding the umbrella, when it is open or closed, in its proper position. And it further consists in a shield that may inclose the springs formed upon the runner, the shape of which is such that, by turning the same, it will operate as a cam movement in its relation to the springs, and cause them to be depressed and forced in contact with the stick, for the purposes described.

Figure 1, sheet 1, shows the position of the umbrella when opened, and my improvement attached thereto. A represents the stick; C the head of the runner to which the ribs I are attached in the usual manner. B represents the shield inclosing the springs $c$, as seen in Fig. 5, said springs being firmly attached to the head of the runner C. This shield is of varying diameter—at its top a true circle, and at its bottom elliptical—so that when placed in position and turned one-quarter of a circle the narrower diameter presses against the springs and forces them against the stick, where they are held firmly; or the shield may be constructed, as seen in Fig. 4, externally, being a true circle, and internally either cut away in the form indicated at $b$, or dotted lines $b'$, so that the varying diameter in this form of a shield operates as a cam in its relation to the springs aforesaid, producing the same results as above described. X X, Fig. 1, are stops formed both on the runner-head C and shield B, to prevent the turning of the latter further than necessary to give full force to the operations of the springs $c\ c$. D, Fig. 1, is a metallic rim fitting upon and around the lower portion of the shield B, which rim and shield are held in proper position by means of the ends of the springs projecting below them, and turned up, as seen in dotted lines at $i$, Fig. 1. The rim D is constructed and used for the purpose of forming a smooth and larger surface for the grasp of the hand or fingers in raising or lowering the umbrella, so that the sharp edges or corners of the lower side of the shield or runner will not injure the hand of the person manipulating it. In the construction and operation of my improvement in umbrellas or in umbrella-runners, I sometimes employ a tubing made of leather, rubber, cloth, or other suitable material, that surrounds the stick. It may be made of any length, fitting closely to the stick, and against which the springs are caused to impinge, by turning the shield hereinbefore described, by reason of the cam movement contained within the shield. This rubber shield or tubing of elastic material is employed for its elastic and adhering qualities, and forms a frictional surface where it comes in contact with the stick or handle of the umbrella. Fitting tightly within the metallic shield, it moves up and down easily, and is peculiarly sensitive to the pressure upon it of the springs referred to, thereby aiding in the support of the umbrella when raised, or securing it when in a lowered position. In sheet 2, and in Figs. 1 to 13, inclusive, are shown certain modifications of my improvement, in which the same principles are involved as shown in sheet 1, Figs. 1 to 5, inclusive, except in this, that in Fig. 1, sheet 2, at O, a slight circular or oval depression is formed in the stick at the top and bottom of the same, in which the projection formed in the springs is forced when the shield is turned, as herein described. The effect of this depression made in the stick does not weaken it to any appreciable extent, and it affords a sure means of retaining the umbrella either in an open or closed condition. Figs. 2 and 3, sheet 2, show the construction of the shield in two parts, Fig. 3 being soldered within Fig. 2; and the point at $b$, Fig. 3, incloses, when turned, the springs, and presses them against the stick, &c. The remaining figures show different positions of the several parts of my invention, and their relation to each other.

It is obvious that the springs herein referred to may be attached to the shield itself on the inner side thereof, and the arrangement of the cam movement applied to the runner; but as the same principle is involved in this mode of application, it is unnecessary to do more than allude to the same.

What I claim as my invention, and desire to secure by Letters Patent, is—

1. The within-described combination of the runner C, springs $c$ $c$ when inclosed within the eccentric shield B, in the manner and for the purpose herein set forth.

2. The combination of the rubber, cloth, leather, or other fibrous lining $d$ with the runner C, shield B, and springs $c$ $c$, in the manner and for the purpose herein described.

3. The rim D, in combination with the shield B, in the manner and for the purpose herein described.

GOUVION GHOLSON GRISWOLD.

Witnesses:
JOHN CURTIS,
C. C. GRISWOLD.